W. S. LANGFORD.
BELT FASTENER.
APPLICATION FILED MAY 1, 1915.
1,202,540.
Patented Oct. 24, 1916.
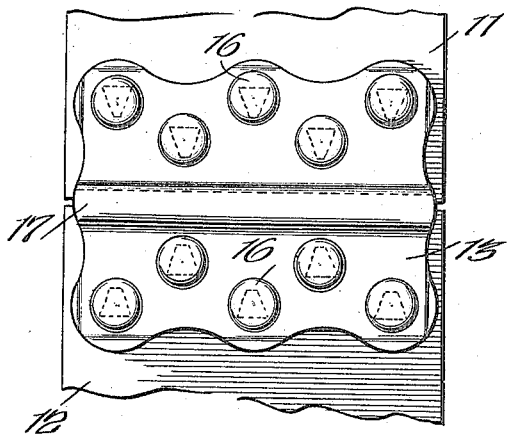
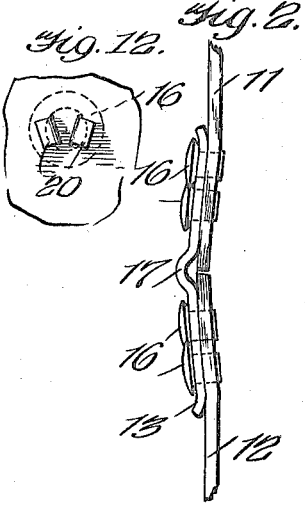
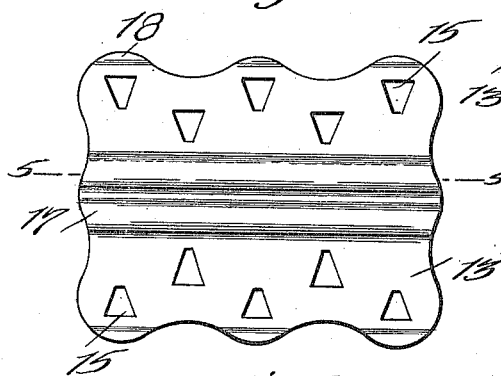
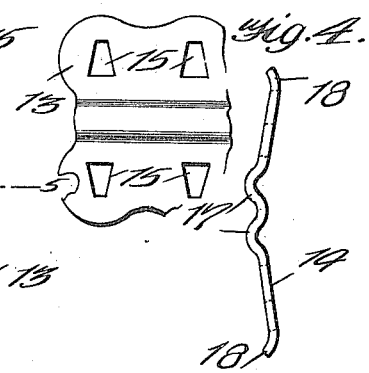
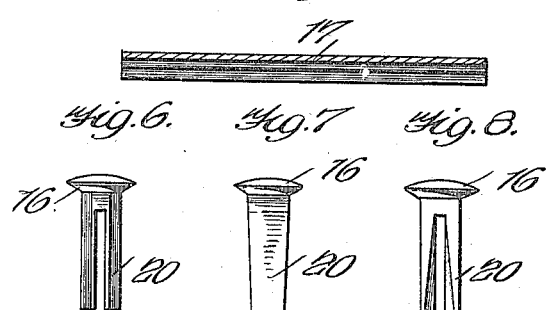
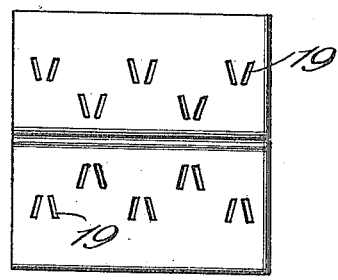
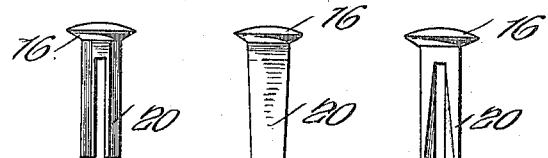
INVENTOR
WILLIAM S. LANGFORD,
BY Munn & Co.
ATTORNEYS
WITNESSES:

UNITED STATES PATENT OFFICE.

WILLIAM S. LANGFORD, OF BALTIMORE, MARYLAND.

BELT-FASTENER.

1,202,540.   Specification of Letters Patent.   Patented Oct. 24, 1916.

Application filed May 1, 1915. Serial No. 25,188.

*To all whom it may concern:*

Be it known that I, WILLIAM S. LANGFORD, a citizen of the United States, and a resident of the city of Baltimore, in the State of Maryland, have invented an Improvement in Belt-Fasteners, of which the following is a specification.

This invention relates to belts for general transmission and more particularly to novel fasteners for the meeting ends of the belts and means for securing said fasteners in position.

Previous to the present invention some fasteners have been constructed with integral prongs for securing the same to the belts and other fasteners are adapted for use in connection with bifurcated rivets having parallel shanks, said prongs and rivets being adapted to extend and clench the belt lengthwise thereof in some instances, and transversely in others. In the first instance, the method has been proven unsatisfactory because the strain on the prongs or rivets is all in a line parallel to the longitudinal edges of the belt causing them to pull through the warp or longitudinal grain thereof and become detached therefrom. In the second instance, the strain is upon the weft or cross grain, and since this is the weakest part of the belt it is obvious that the same cannot withstand the strain and soon the fasteners break away therefrom.

The rivets used in connection with the present invention are designed to overcome the above objections by constructing the same with shanks which extend at diverging angles to each other and also to the transverse axis of the rivets. This arrangement of the shanks will permit the same to grasp and clench both the warp and weft or grain of the belt at oblique angles thereto, thereby materially strengthening the fastener as a whole.

The inventive idea involved is capable of receiving a variety of mechanical expressions, some of which, for the purpose of illustrating the invention, are shown in the accompanying drawings, in which—

Figure 1 is a plan view of the meeting ends of a belt showing the fastener applied thereto and constructed in accordance with the invention. Fig. 2 is an edge elevation thereof. Fig. 3 is a plan view of a slightly modified form of fastener. Fig. 4 is an edge view thereof. Fig. 5 is a section on the line 5—5 of Fig. 3. Figs. 6, 7 and 8 are elevations of the rivet used in connection with the invention. Fig. 9 is a plan view of another slightly modified form of fastener. Fig. 10 is an end elevation of the rivet. Fig. 11 is a perspective view of the rivet. Fig. 12 is a bottom plan view thereof showing the shanks in folded positions, and Fig. 13 is a fragmentary view of a slight modification of still another form of fastener, showing the openings therein extending in opposite directions from the openings in Fig. 3.

Referring more particularly to the accompanying drawings in which like reference characters designate similar parts, the numerals 11 and 12 indicate the meeting ends of a drive belt made of any suitable material. The fastener, which is more specifically described and claimed in the copending application filed October 6, 1915, and serially numbered 54,373, comprises a plate 13 slightly bowed, as indicated at 14 in Fig. 4. In Figs. 1 and 3 the plate is provided with substantially triangular openings 15 to receive the fastening rivets 16 which comprise the essential feature of this invention. In Fig. 9, the plate is provided with diverging slots 19 instead of the openings 15. The fasteners have their edges turned up as indicated at 18 in Figs. 1 to 4.

Each of the rivets 16 comprises a head having extending therefrom the oppositely disposed shanks 20. These shanks are arranged at diverging angles to each other and to the transverse axis of the rivet, as shown. Adjacent longitudinal edges of the shanks are thickened contiguous to the head of the rivet and tapered toward their outer ends and also toward the opposite longitudinal edges thereof, as clearly shown in Fig. 8 of the drawing. The space between the adjacent edges of the thickened portions of the shanks will then be wedge-shaped and greater than the space between the opposite edges, the latter being parallel and of uniform thickness throughout. Thus it will be apparent that each shank, in cross section, will also be of a wedge-shaped formation similar to the space between the adjacent edges of the thickened portions of the shanks and also that the angles formed by the sides of each shank will decrease from the inner to the outer end thereof. When the rivet 16 is inserted through an opening in the fastener 13 and the belt, the shanks 20 are bent outwardly to clench the belt and owing to their angular construction and arrangement the portions of said shanks engaging said belt will extend obliquely to the warp and weft or grain of the belt, as shown in Fig. 12 whereby the same is securely gripped and prevented from tearing away from the fastener owing to the great amount of strain to which the meeting ends 11 and 12 are subjected.

From the foregoing description taken in connection with the accompanying drawing it will be seen that the invention contemplates providing a belt fastener and rivets therefor which are extremely simple in construction, efficient, durable, and which may be manufactured at a minimum cost.

I claim:—

1. A rivet comprising shanks extending at an angle to each other and tapering longitudinally and transversely.

2. A rivet comprising shanks extending at an angle to each other, adjacent longitudinal edges of said shanks being thickened at their inner ends and tapered toward the outer ends thereof.

3. A rivet comprising shanks adjacent longitudinal edges of which are tapered to provide a substantially wedge-shaped space therebetween, each shank being also substantially wedge-shaped in cross section, the angle formed by the sides of each shank decreasing from the inner to the outer end thereof.

4. A rivet comprising shanks arranged at an angle to the transverse axis thereof, adjacent longitudinal edges of said shanks being thickened, the space between said thickened edges being greater than the space between the opposite longitudinal edges, the latter being of uniform thickness throughout their lengths.

5. A rivet having shanks, adjacent longitudinal edges of which are of greater thickness than the opposite longitudinal edges.

6. A rivet comprising shanks having certain longitudinal edges of uniform thickness and the opposite edges of varying thickness.

7. A rivet comprising shanks extending at an angle to each other and of a transverse wedge-shaped formation.

8. A rivet comprising a head, and shanks extending therefrom and having their inner opposed transverse edges parallel to each other at their junction with said head, adjacent longitudinal edges of said shanks being of greater thickness than the opposite longitudinal edges and tapered toward their outer ends whereby the outer transverse edges of the latter will be at an angle to each other.

9. A rivet including shanks of substantially wedge-shaped formation in cross section, the angle formed by the sides of each shank decreasing from the inner to the outer end thereof.

10. A rivet including a shank of a wedge-shaped formation in cross section, the angle formed by the sides of the shank decreasing from the inner to the outer end thereof.

WILLIAM S. LANGFORD.

Copies of this patent may be obtained for five cents each, by addressing the "Commissioner of Patents, Washington, D. C."